(12) United States Patent
Maguire

(10) Patent No.: US 8,083,472 B2
(45) Date of Patent: Dec. 27, 2011

(54) SHAFT BEARING ARRANGEMENT

(75) Inventor: Alan R. Maguire, Derby (GB)

(73) Assignee: Rolls-Royce PLC, London (GB)

( * ) Notice: Subject to any disclaimer, the term of this patent is extended or adjusted under 35 U.S.C. 154(b) by 719 days.

(21) Appl. No.: 12/232,586

(22) Filed: Sep. 19, 2008

(65) Prior Publication Data

US 2009/0103849 A1 Apr. 23, 2009

(30) Foreign Application Priority Data

Oct. 20, 2007 (GB) .................................. 0720628.7

(51) Int. Cl.
F03D 11/00 (2006.01)

(52) U.S. Cl. ........ 415/142; 415/110; 415/111; 415/112; 415/113; 415/229; 384/490; 384/519; 384/535

(58) Field of Classification Search .......... 415/110–113, 415/142, 229; 384/490, 519, 579, 535
See application file for complete search history.

(56) References Cited

U.S. PATENT DOCUMENTS

| 4,309,144 | A | | 1/1982 | Eggmann et al. | |
| 4,884,942 | A | | 12/1989 | Pennink | |
| 5,735,666 | A | * | 4/1998 | Johnston | 415/34 |
| 6,073,439 | A | * | 6/2000 | Beaven et al. | 60/223 |
| 6,079,200 | A | * | 6/2000 | Tubbs | 60/226.1 |
| 6,109,022 | A | * | 8/2000 | Allen et al. | 60/223 |
| 2006/0088408 | A1 | * | 4/2006 | Prestel et al. | 415/111 |
| 2006/0110244 | A1 | * | 5/2006 | Brault et al. | 415/110 |
| 2008/0181763 | A1 | * | 7/2008 | Webster et al. | 415/9 |
| 2009/0246018 | A1 | * | 10/2009 | Kondo et al. | 415/229 |

* cited by examiner

Primary Examiner — Matthew Landau
Assistant Examiner — Joseph C Nicely
(74) Attorney, Agent, or Firm — Oliff & Berridge, PLC

(57) ABSTRACT

A gas turbine engine (10) comprising a first turbine (19) and a first compressor (13) mounted on a first shaft (26) and a bearing arrangement (52, 34) supporting the shaft (26), the bearing arrangement is subject to a total end load and comprises a fixed bearing (34), a load share bearing (52) and a bearing end load management system (50) that is capable of applying a variable load to the load share bearing to manage total end load between the bearings. The bearing end load management system comprises a static diaphragm (54) that defines part of a chamber (56) and that is coupled to the load share bearing whereby increased pressurization of the chamber loads the diaphragm which in turn increases the proportion of the total end load on the load share bearing.

15 Claims, 4 Drawing Sheets

SHAFT BEARING ARRANGEMENT

The present invention relates to a bearing arrangement for a shaft and in particular, but not exclusively, to a passive bearing end load management system for bearings on which a shaft is supported in a gas turbine engine.

Conventional turbine engines comprise a shaft supported by a thrust bearing, which accommodate the net resultant axial force from say a low pressure (LP) turbine and a compressor, and a roller bearing, which only radially locates the shaft. With the increasing desire for more powerful engines reduction of core engine diameter and increased core engine rotational speed mean that the life of a thrust bearing is greatly reduced. Servicing intervals become shorter and costs therefore escalate. Furthermore, as a bearing's rotational speed increases as well as its diameter increasing the centrifugal force of each rolling element in the bearing becomes very significant in the bearing's life.

To overcome some of these problems a pressurised chamber is provided to transfer some of net LP turbine load to the engine mounts, thereby reducing the total load on the thrust bearing. However, and as will be described in more detail in the description relating to FIG. 1, the pressurised chamber requires rotating seals which significantly reduce the engine's performance and efficiency.

Therefore it is an object of the present invention to provide a bearing arrangement for a shaft which obviates the above problems.

In accordance with the present invention there is provided a gas turbine engine comprising a first turbine and a first compressor mounted on a first shaft and a bearing arrangement supporting the shaft about an axis, the bearing arrangement is subject to a total end load and comprises a fixed bearing, a load share bearing and a bearing end load management system that is capable of applying a variable load to the load share bearing to manage total end load between the bearings, the bearing arrangement is characterised by the bearing end load management system comprising a static diaphragm that defines part of a chamber and that is coupled to the load share bearing whereby increased/decreased pressurisation of the chamber loads the diaphragm which in turn increases/decreases the proportion of the total end load on the load share bearing.

Preferably, the gas turbine engine comprises a second turbine and a second compressor mounted on a second shaft, the chamber is pressurised by gas from the second compressor.

Preferably, the fixed bearing is mounted between the first shaft and the second shaft.

Preferably, the load share bearing is connects between the diaphragm and the shaft.

Preferably, the chamber is further defined by a static structure; the static structure and the diaphragm are slidably sealed to one another to allow axial movement therebetween.

Preferably, two seals are defined between the diaphragm and the static structure.

Preferably, a pipe extends across the chamber to allow substantially equal pressure either side of the chamber.

A broader aspect of the present invention is a bearing arrangement of a shaft having an axis, the bearing arrangement is subject to a total end load and comprises a fixed bearing, a load share bearing and a bearing end load management system that is capable of applying a variable load to the load share bearing to manage total end load between the bearings, the bearing arrangement is characterised by the bearing end load management system comprises a static diaphragm that defines part of a chamber and is coupled to the load share bearing whereby increased/decreased pressurisation of the chamber loads the diaphragm which in turn increases/decreases the proportion of the total end load on the load share bearing.

Preferably, the proportion of the total end load on the load share bearing is greater than 50% and more preferably, between 55% and 85%.

Preferably, the diaphragm is annular and comprises at least one bend and may comprise at least one flat portion. Preferably, the at least one flat portion is positioned radially outwardly of the bend.

Preferably, a pipe comprises a valve to control the flow of pressurised gas into the chamber.

Preferably, a number of pipes, each comprising a valve to control the flow of pressurised gas into the chamber, are connected to a number of differently pressurised gas sources.

In another aspect of the present invention there is provided a method of operating a bearing arrangement as described in the above paragraphs, wherein the method comprises the step of pressuring the chamber above a predetermined limit.

The present invention will be more fully described by way of example with reference to the accompanying drawings in which.

Figure 1:
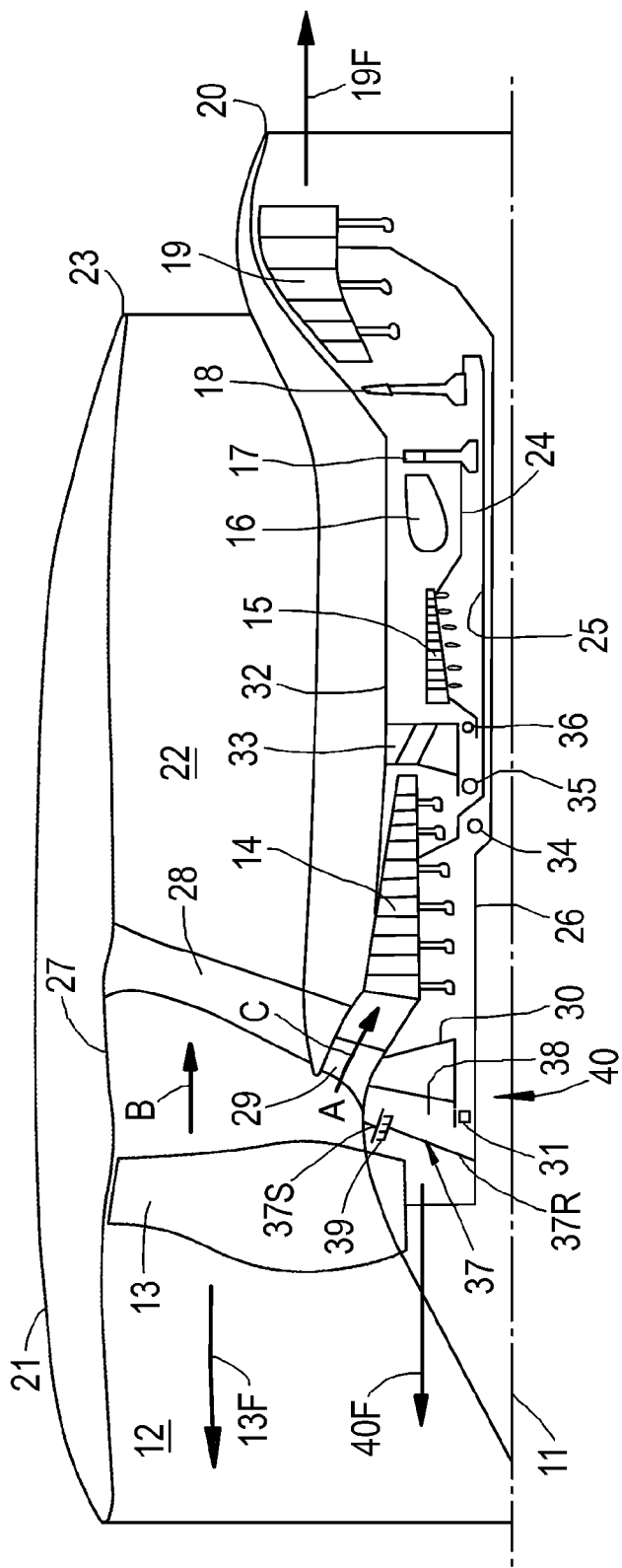
FIG. 1 is a schematic section of part of a ducted fan gas turbine engine comprising a prior art bearing arrangement.

With reference to FIG. 1, a ducted fan gas turbine engine is generally indicated at 10 and has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core engine exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first air B flow which passes through the bypass duct 22 to provide propulsive thrust and a second air flow into the intermediate pressure compressor 14. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts 24, 25, 26.

The fan 13 is circumferentially surrounded by a fan casing 27, which is supported by an annular array of outlet guide vanes 28. Core engine inlet guide vanes 29 support a static structure 30, which is sometimes referred to as a front bearing housing. An LP radial bearing 31 passes radial forces between the static structure 30 and the low pressure shaft 26.

The core engine is surrounded by an intercase 32, which supports a static intercase bearing housing 33. The intercase 32 also connects to the outlet guide vanes 28. A LP thrust bearing 34 carries both axial (thrust) and radial loads between the LP shaft 26 and IP shaft 25. An intermediate pressure (IP) thrust bearing 35 is supported by the static intercase bearing housing 33 and supports the IP shaft in the vicinity of the LP thrust bearing 34. The IP thrust bearing 35 carries axial (thrust) and radial loadings. The static intercase bearing housing 33 further supports an HP thrust bearing 36 which also supports the IP shaft 24. Other bearings are present within the gas turbine engine as well known in the art, but have been omitted here for clarity.

Forwardly of the static structure 30 is a diaphragm 37 which defines a chamber 38 between it and the static structure 30. The diaphragm 37 comprises a rotating part 37R and a static part 37S that define a seal 39 located between the two parts.

During engine operation high pressure air pressurises the chamber 38 and the resultant pressure causes the diaphragm 37 and static structure 30 to perform as a piston 40. This piston action causes a forward force 40F on the LP shaft 26. The fan 13 also produces a forward force 13F. The LP turbine 19 produces a rearward force 19F.

In this prior art bearing arrangement, bearing end load management is by the use of a rotating, air-pressurised piston 40, which balances the rearward force 19F to a level that the location (thrust) bearings 34 can accommodate. In a large civil aero engine, the LP bearing end load is the load 19F that results from the large rearwards pull from the LP turbine 19 against the lesser forwards pull of the fan system 13F. The LP system balance piston 40 is a means of applying further forwards load 40F to bring the resultant load to within the capacity of a level that the LP location bearing 34 can manage.

In pursuit of improved engine performance, the core engine is reduced in size (diameter) and operated at increasingly higher overall pressure ratio (OPR) to the maximum temperature limits of material technology. This has the effect of raising the pressure drop across the LP turbine 19 which results in an ever increasing rearwards axial load 19F on the LP shaft 26. Thus, the pursuit of improved engine performance leads the designer to provide increasingly higher pressurised air behind the LP balance piston.

The over-riding problem with this rotating air-pressurised piston 40 is the performance penalty associated with air leakage at the rotating to static seal 39 interface. As engine performance increases and the LP turbine load increases further increases in the pressure of the piston 40 are required, but inevitably increase the leakage through the seal 39 and therefore the engine suffers a performance loss and an increase in fuel consumption.

It is physically possible to include larger location bearings 34 in the internal gearbox (effectively the bearings 34, 35, 36) in order to reduce the amount of load required of the LP system balance piston 40; however, this is of limited benefit as the internal gearbox bearings operate at relatively high speeds and the centrifugal contribution of the ball on bearing life soon becomes the dominant design driver.

Another possible solution is to swap over the bearings 31 and 34. However, not only does this affect the "fan blade off" and "windmill" characteristics of the engine but these relatively large bearings are substantially heavier themselves and mean that the surrounding support structures also require strengthening thereby increasing weight still further. The vanes 28 and 29 will also require additional thickening to carry the increased load which in turn causes aerodynamic inefficiencies.

The use of a very large bearing in the static structure 30 also becomes complicated by the requirement to fail the bearing locating fuse during a "fan blade off" event followed by the requirement to maintain axial retention of the whole LP system during the "windmill" fly home process. These two requirements can add significant amounts of extra weight to this potential option.

Referring now to the present invention which is described with reference to FIGS. 2 and 3, where the same components as the prior art have been given the same reference numbers. The gas turbine engine 10 comprises a low pressure system including the turbine 19 and the fan 13 (or compressor) mounted on the first shaft 26. A bearing arrangement supports the shaft 26 and is subject to a total end load. The bearing arrangement (34, 50) comprises a fixed bearing 34, a load share bearing 52 and a bearing end load management system 50. The bearing end load management system 50 is capable of applying a variable load to the load share bearing to manage the total end load distributed between the bearings 34, 52. This bearing end load management system 50 does not significantly change the total bearing end load, but alters the proportion of the total bearing end load applied to each bearing. Note that this is a very different arrangement to the prior art 'piston' arrangement where the piston transfers significant thrust to the support structure so that the net thrust carried by the bearing simply reduces.

The bearing end load management system 50 comprises a static diaphragm 54 that defines part of a chamber 56 and that is coupled to the load share bearing 52. Increased pressurisation of the chamber 56 loads the diaphragm 54 which in turn increases the proportion of the total end load on the load share bearing 52.

A second chamber 84 is formed forwardly of the diaphragm 54 and rearwardly of the fan's disc 86 which is connected to the LP shaft 26. A rotating seal member 88R is attached to the disc 86 to form a seal 88 with a static part 88S that is attached to the inlet guide vane 29 in the region of the fixed support 82.

Pressurised gas 58 is fed into the chamber 56 from a higher pressure system in this example the IP compressor 14, but could also be from the HP compressor 15. A conduit 60 is shown on FIG. 2 which leads from IP compressor 14 and through the inlet guide vane 29. It is preferable to have a number of conduits 60 around the circumference of the engine. Each conduit 60 is in continuous communication with the chamber 56 such that the bearing system 50 is effectively passive. When the engine increases in speed the LP turbine 19 increases the total end load on the LP shaft. At the same time the compressor 14 increases its pressure ratio and intrinsically delivers increasingly pressurised gas to the chamber 56. This increases the proportion of bearing end load onto the load share bearing 52. The fixed bearing 34 therefore does not become 'overloaded' and is designed lighter and/or has an increased in-service life.

The chamber 56 is further defined by the static structure 30. The static structure 30 and the diaphragm 54 define between them two slidable seals 65, 66 and which allow axial movement therebetween. The amount of axial movement is relatively small perhaps being up to 10 mm but more usually about 4 or 5 mm. The seal 65 is a ring seal and surrounds a piston 63. The piston 63 connects between the diaphragm 54 and the load share bearing 52 as will be described in more detail later. A 'squeeze film' contact 64 is formed between the load share bearing 52 and the static structure 30 both to allow for axial movement during load sharing when there is a change in pressure in the chamber 56 and also to provide vibration damping to the LP system in the unlikely occurrence of a 'fan blade off' event.

One advantage of the present invention is that these slidable seals 65, 66 are non-rotating and therefore may be designed and made with very tight gaps. Typically, these non-rotating seal clearances may be an order of magnitude less than rotating seal clearances. Therefore there is a very substantial reduction in the loss of high pressure gas within the chamber 56 compared to the prior art, leading to significantly greater engine efficiency.

Figure 3:
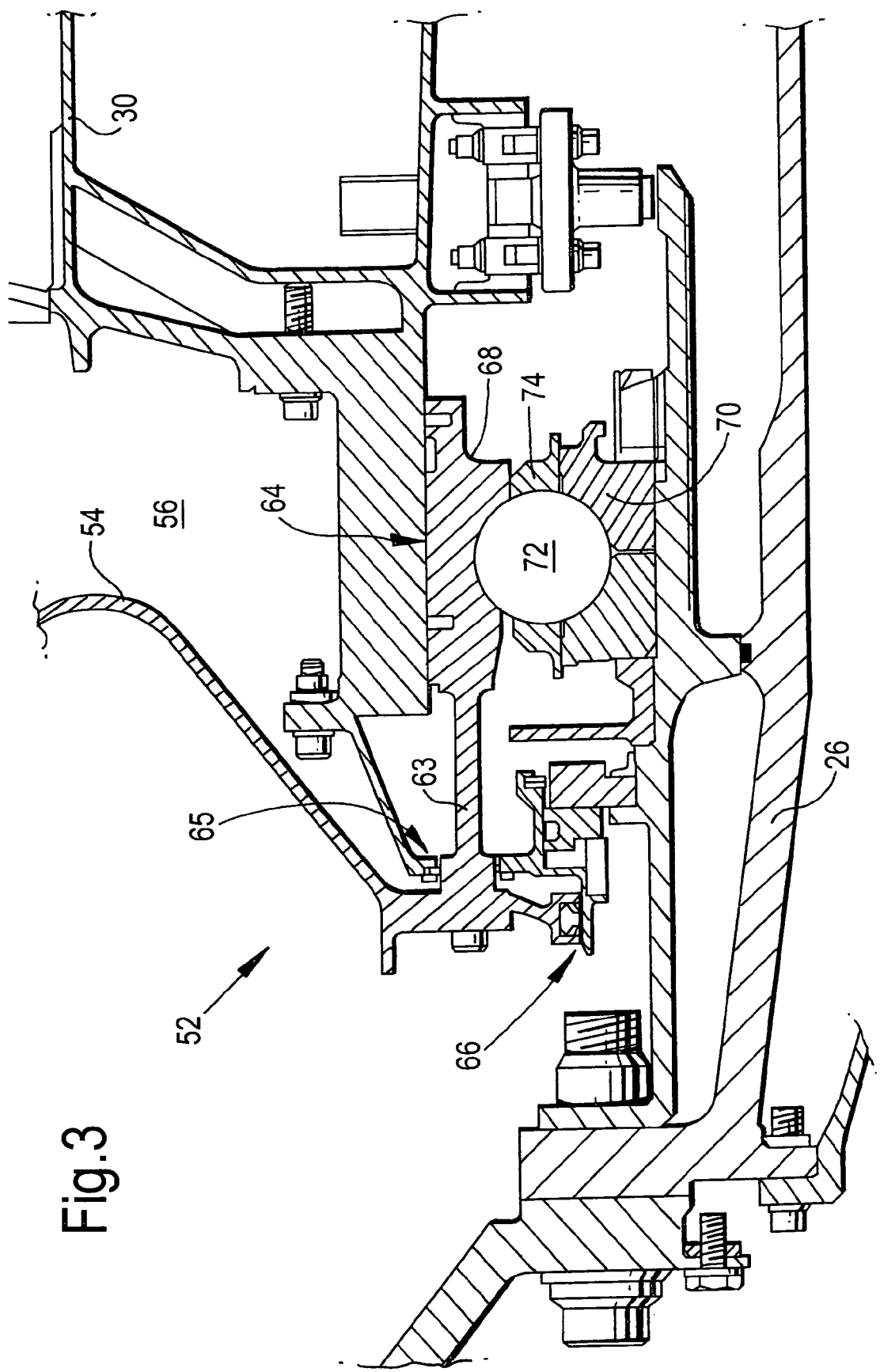
FIG. 3 is a further enlarged view on A in FIG. 1, but now showing a bearing arrangement in accordance with the present invention.

As can be seen in FIG. 3 the load share bearing, indicated generally as 52, comprises a static race 68 connected to the diaphragm 54 and a rotating race 70 connected to the LP shaft 26. The static race 68 is connected to the diaphragm 54 via a piston 63, which is one of a plurality around the circumference of the engine. Spherical elements 72 roll within the races 68, 70 and have a cage 74 to space them apart. Because this load share bearing 52 rotates between the LP shaft and a static frame, centrifugal forces are far less problematic than the fixed bearing 34 which rotates relatively quickly between the LP and IP shafts 26, 25. Therefore the load share bearing 52 is capable of carrying more load than the fixed bearing 34. For an equivalent in-service life to the fixed bearing 34, the load share bearing will carry about 75% of the total end load of the shaft. Dependent on engine operating levels the load share bearing will almost always carry at least 50% and usually between 55 and 85% of the total end load. It should be appreciate that in the unlikely event of a failure of one of the bearings or other associated engine structure all of the end loading can be carried by either bearing for at least the duration of the remainder of an aircraft flight cycle.

To improve the performance of the load share bearing a pipe 76, carrying gas flow 78, extends across the chamber 56 to allow substantially equal pressure either side of the chamber 56. Therefore the diaphragm and static structure will move relative to one another by consistent and known amounts.

Figure 2:
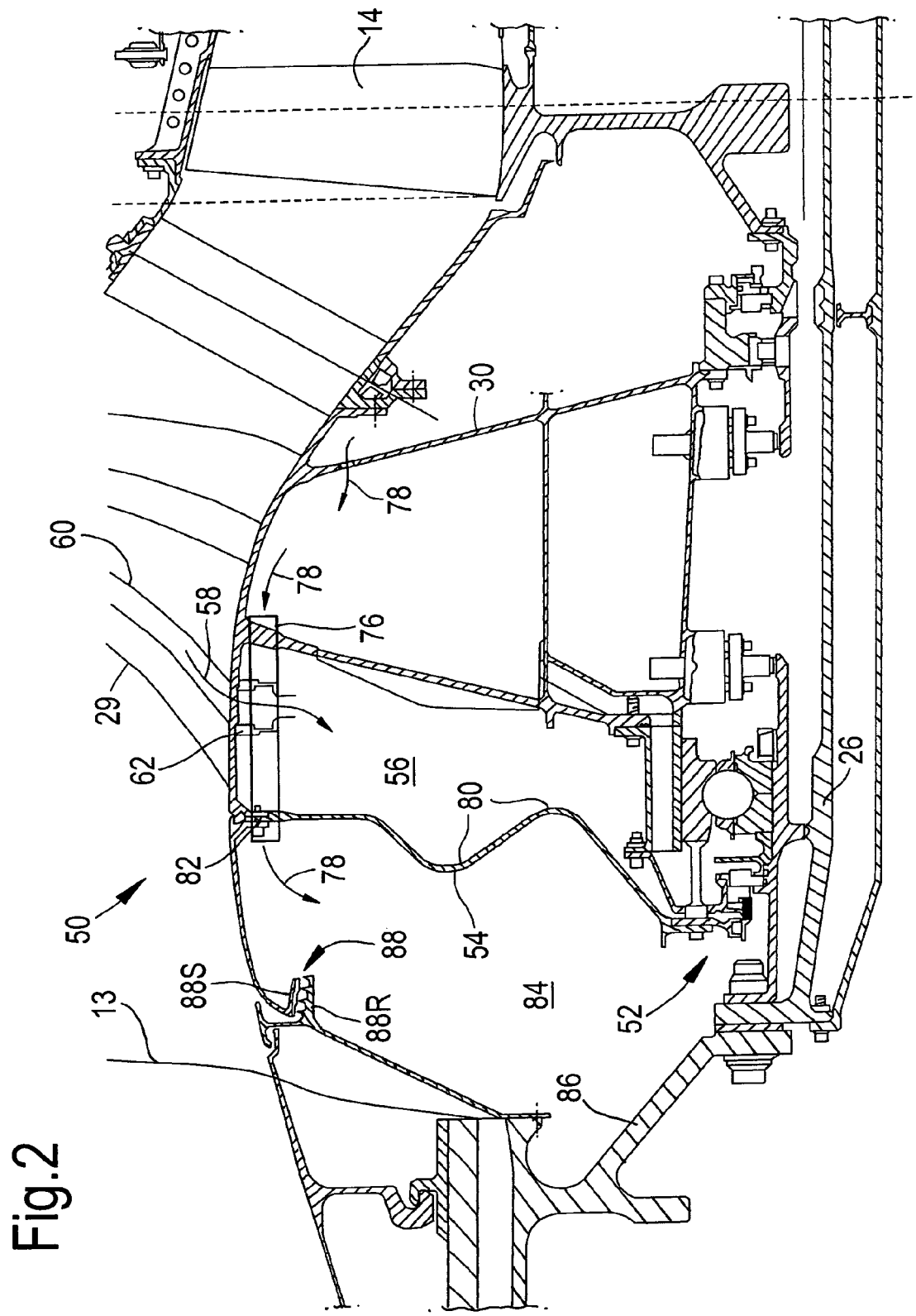
FIG. 2 is an enlarged view on A in FIG. 1, but now showing a bearing arrangement in accordance with the present invention.

As can be seen most clearly in FIG. 2, the diaphragm 54 is an annular disc and comprises two out-of-plane bends 80. These bends 80 are useful to enable the slidable seal 66 to move only axially rather than to subtend a radial displacement. As high pressure gas enters the chamber 56 the force rotates the diaphragm 54 about its radially outer fixed support 82. The diaphragm 54 bends about the support 82 and begins to slide along the radially inward seal 66. The pressure in the chamber 56 also 'flattens' the diaphragm slightly meaning that the seal 66 parts do not lose contact with one another. Furthermore, the corrugation(s) or bends 80 stiffen the diaphragm relative to its section thickness meaning it can be lighter weight than a flat section diaphragm of the same stiffness. In other words the corrugated shape is stiffer to axial movement, at its radially inward positioned seals 65, 66, than a flat diaphragm having the same sectional thickness. Thus the number and angle of the bends can be optimised for any given application to minimise weight, linearity of movement of the seals and stiffness, which with the pressure in the chamber, ultimately dictates the load share between bearings 52, 34.

Figure 4:
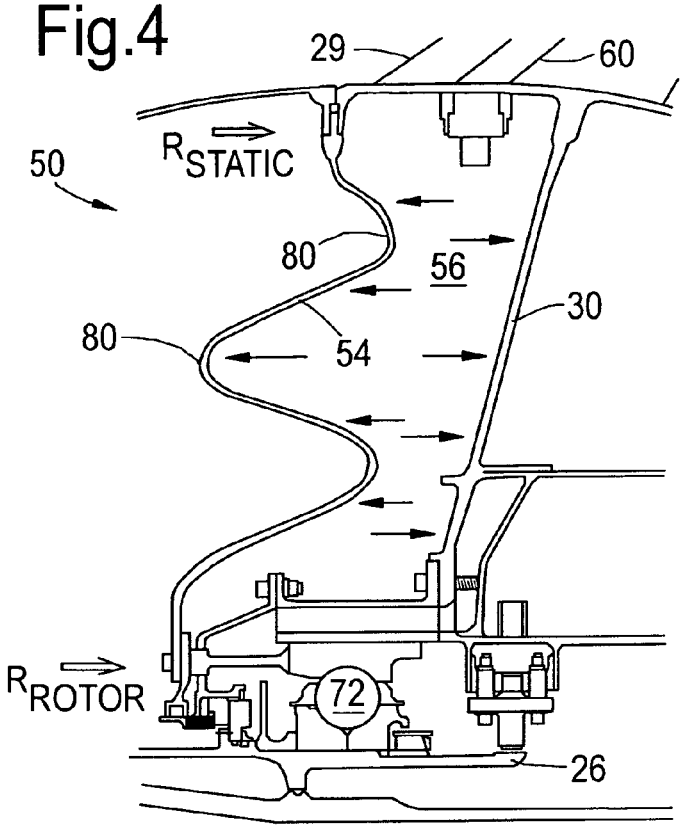
FIG. 4 is an enlarged view on A in FIG. 1, but now showing an alternative bearing arrangement in accordance with the present invention.

The flexibility/stiffness of the diaphragm 54 can be designed for each application to suit the required load sharing proportions between bearings 34 and 52. FIG. 4 shows an alternative bearing arrangement comprising a relatively stiff diaphragm 54. The diaphragm 54 comprises a further bend 80 than that shown in FIGS. 2 and 3 and therefore has a greater second moment or area and hence stiffness in the axial direction. The diaphragm 54 also comprises minimal straight or flat regions near to its supports. The change in pressure ΔP in the chamber 56 imparts a force on the diaphragm 54 and therefore reaction forces on its radially outward support $R_{static}$, the static structure and radially inward 'support' the rotor or shaft $R_{rotor}$. With a relatively stiff diaphragm 54 the reaction forces are about equal and a relatively low load is applied to the shaft 26.

Figure 5:
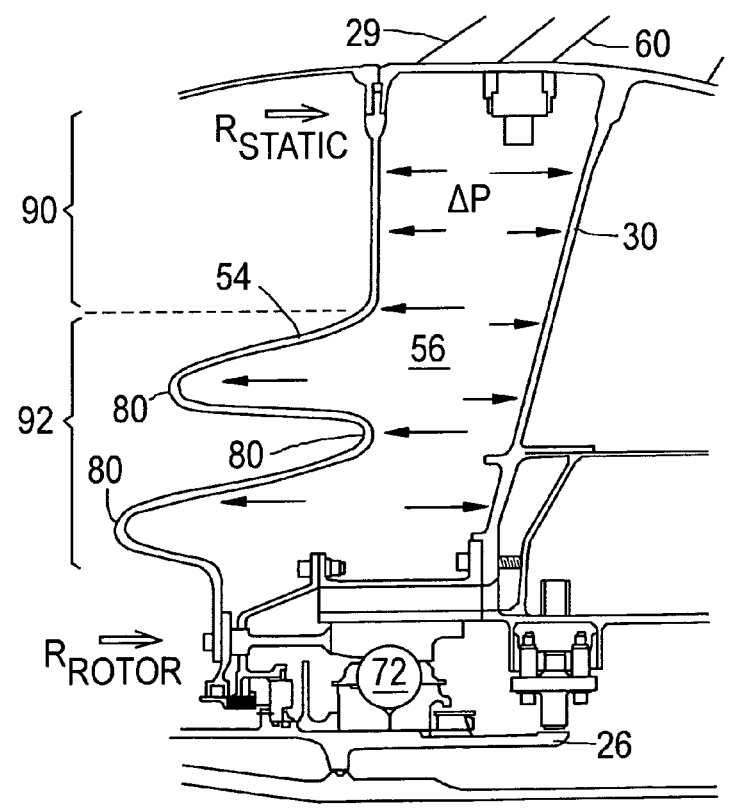
FIG. 5 is an enlarged view on A in FIG. 1, but now showing an alternative bearing arrangement in accordance with the present invention.

In FIG. 5 the diaphragm 54 comprises a flat portion 90 and a stiff portion 92 comprising a number of bends 80. The bends 80 give the stiff portion 92 its stiffness as described above. The flat portion 90, radially outward of the stiff portion 92, means that the diaphragm 54 flexes more easily about the radially outward support. Thus in this case $R_{rotor}$ is significantly greater than $R_{static}$ and a relatively high load is applied to the shaft 26.

Although the above described bearing system is passive, the pipe 60 may include a valve 62 to fine tune the rate and extent to which the chamber 56 is pressurised. Preferably, an array of pipes and valve are situated around the circumference of the engine. The valve 62 may be linked to an electronic engine controller (commonly termed an EEC) and the extent to which it is opened and closed is dependent on an engine function, for example, the throttle position, a shaft speed or a load sensor on any one of the bearings 34, 52.

The present invention may be further extended to a more active system of bearing end load management by having a number of the pipes in the array of pipes attached to different parts of the or more than one compressor. This provides the capability of selecting a suitable gas pressure for the desired bearing end load management between fixed and load share bearing. In particular, bearing end load management may be made more effective during transient engine conditions, for example during deceleration.

It should be appreciated that the above described exemplary embodiment of the present invention can be applied to other shafts 24, 25 and that there may be more than one load share bearing system on any one machine. The present invention may be applied to any gas or steam turbine engine as well as other turbomachinery.

The present invention also lends itself to a method of operating a bearing arrangement as described above. The method comprises the step of pressuring the chamber above a predetermined limit such as a load on one of the bearings 34, 52, an engine thrust setting, a shaft speed or other engine condition.

The invention claimed is:

1. A gas turbine engine comprising: a first turbine and a first compressor mounted on a first shaft and a bearing arrangement supporting the shaft about an axis, the bearing arrangement is subject to a total end load and comprises a fixed bearing, a load share bearing and a bearing end load management system that is capable of applying a variable load to the load share bearing to manage total end load between the bearings, the bearing arrangement is characterised by the bearing end load management system comprising a static diaphragm that defines part of a chamber and that is coupled to the load share bearing whereby increased/decreased pressurisation of the chamber loads the diaphragm which in turn increases/decreases a proportion of the total end load on the load share bearing.

2. A gas turbine engine as claimed in claim 1 wherein the gas turbine engine comprises a second turbine and a second compressor mounted on a second shaft, the chamber is pressurised by gas from the second compressor.

3. A gas turbine engine as claimed in claim 1 wherein the fixed bearing is mounted between the first shaft and the second shaft.

4. A gas turbine engine as claimed in claim 1 wherein the load share bearing connects between the diaphragm and the shaft.

5. A gas turbine engine as claimed in claim 1 wherein the chamber is further defined by a static structure, the static structure and the diaphragm are slidably sealed to one another to allow axial movement therebetween.

6. A gas turbine engine as claimed in claim 5 wherein two seals are defined between the diaphragm and the static structure.

7. A gas turbine engine as claimed in claim 1 wherein a pipe extends across the chamber to allow substantially equal pressure either side of the chamber.

8. A gas turbine engine as claimed in claim 1 wherein the proportion of the total end load on the load share bearing is greater than 50%.

9. A gas turbine engine as claimed in claim 1 wherein the proportion of the total end load on the load share bearing is between 55% and 85%.

10. A gas turbine engine as claimed in claim 1 wherein the diaphragm is annular and comprises at least one bend.

11. A gas turbine engine as claimed in claim 1 wherein the diaphragm is annular and comprises at least one flat portion.

12. A gas turbine engine as claimed in claim 1 wherein a pipe comprises a valve to control the flow of pressurised gas into the chamber.

13. A gas turbine engine as claimed in claim 1 wherein a number of pipes, each comprising a valve to control the flow of pressurised gas into the chamber, are connected to a number of differently pressurised gas sources.

14. A method of operating a bearing arrangement as claimed in claim 1 wherein the method comprises the step of pressuring the chamber above a predetermined limit.

15. A bearing arrangement of a shaft having an axis, the bearing arrangement is subject to a total end load and comprises: a fixed bearing, a load share bearing and a bearing end load management system that is capable of applying a variable load to the load share bearing to manage total end load between the bearings, the bearing arrangement is characterised by the bearing end load management system comprises a static diaphragm that defines part of a chamber and is coupled to the load share bearing whereby increased/decreased pressurisation of the chamber loads the diaphragm which in turn increases/decreases a proportion of the total end load on the load share bearing.

* * * * *